(12) United States Patent
Makita et al.

(10) Patent No.: US 7,021,438 B2
(45) Date of Patent: Apr. 4, 2006

(54) POWER TRANSMISSION DEVICE FOR ASTRIDE-RIDING VEHICLE

(75) Inventors: Seiji Makita, Hamamatsu (JP); Masafumi Imasaka, Hamamatsu (JP); Tokuji Yoshimoto, Hamamatsu (JP)

(73) Assignee: Yutaka Giken Co., Ltd., Shizuoka (JP)

( * ) Notice: Subject to any disclaimer, the term of this patent is extended or adjusted under 35 U.S.C. 154(b) by 0 days.

(21) Appl. No.: 10/700,042

(22) Filed: Nov. 4, 2003

(65) Prior Publication Data

US 2004/0211637 A1 Oct. 28, 2004

(51) Int. Cl.
*F16D 33/20* (2006.01)
*F16H 45/00* (2006.01)

(52) U.S. Cl. ........................... 192/3.21; 60/366
(58) Field of Classification Search ............... 192/3.21, 192/3.25, 3.26, 3.27; 416/180; 60/341, 60/361, 362, 366
See application file for complete search history.

(56) References Cited

U.S. PATENT DOCUMENTS

| | | | | |
|---|---|---|---|---|
| 2,663,148 A | * | 12/1953 | Jandasek | 60/362 |
| 2,663,149 A | * | 12/1953 | Zeidler et al. | 60/362 |
| 3,797,243 A | * | 3/1974 | Trusov | 60/361 |
| 5,255,516 A | * | 10/1993 | Ejiri et al. | 60/362 |
| 5,313,794 A | * | 5/1994 | Hara et al. | 60/365 |
| 5,487,003 A | * | 1/1996 | Iwasawa et al. | 60/361 |
| 5,999,873 A | * | 12/1999 | Minowa et al. | 701/51 |
| 6,374,972 B1 | * | 4/2002 | Yoshimoto et al. | 192/3.21 |
| 2004/0026201 A1 | * | 2/2004 | Imasaka et al. | 192/3.23 |

FOREIGN PATENT DOCUMENTS

JP 2001-105933 4/2001

* cited by examiner

*Primary Examiner*—Rodney H. Bonck
(74) *Attorney, Agent, or Firm*—Arent Fox PLLC

(57) ABSTRACT

A power transmission device for an astride-riding vehicle is provided, the power transmission device including a torque converter T and a clutch C disposed in series in a transmission route between an engine E and a gear speed change device M. The torque converter T is arranged so that a pump capacity $\tau$ is a maximum at a speed ratio e=0, and gradually decreases in response to an increase in the speed ratio $\underline{e}$. Linear properties in which both the engine rotational speed and the turbine rotational speed increase substantially linearly in response to an acceleration operation of the engine can therefore be obtained, thereby providing good drivability.

4 Claims, 11 Drawing Sheets

CHARACTERISTICS OF PRIOR ART

POWER TRANSMISSION DEVICE FOR ASTRIDE-RIDING VEHICLE

FIELD OF THE INVENTION

The present invention relates to a power transmission device used in an astride-riding vehicle such as a buggy or a motorcycle, and in particular to an improvement of a power transmission device in which a torque converter and a clutch are disposed in series in a transmission route between an engine and a gear transmission system.

BACKGROUND ART

Such a power transmission device for an astride-riding vehicle is already known as disclosed in, for example, Japanese Patent Application Laid-open No. 2001-105933.

Conventionally, with regard to the characteristics of a torque converter for a general vehicle, in order to minimize creep while idling, as shown in FIG. 10, a pump capacity is set to be a maximum at a speed ratio $e$ of about 0.5 (high speed ratio), and the pump capacity at a speed ratio $e$ of 0 is set to be slightly lower than the maximum pump capacity. The pump capacity is also set to gradually decrease when the speed ratio $e$ exceeds about 0.5, to rapidly decrease when the speed ratio $e$ exceeds 0.8 (coupling point), and to eventually be a minimum. Setting the pump capacity in this way eliminates the sensation of slip when cruising.

As described above, since the pump capacity changes only a little when the speed ratio $e$ changes from 0 to 0.5, as is clear from FIG. 11, the gap between the pump torque curve at a speed ratio $e=0$ and the pump torque curve at a speed ratio $e=0.5$ is small. As a result, as shown by the broken line in FIG. 9, even when the speed ratio $e$ increases from 0 to 0.5, the engine rotational speed hardly increases because of the balance between the engine torque and the pump torque. Therefore, when an acceleration operation of a throttle valve is carried out from an idling state, the turbine rotational speed, in other words, the vehicle speed, increases without a large increase in the engine rotational speed.

However, in order to achieve good drivability, sport astride-riding vehicles require linear properties in which both the engine rotational speed and the turbine rotational speed increase substantially linearly in response to an acceleration operation of the throttle valve.

DISCLOSURE OF THE INVENTION

The present invention has been attained under the above-mentioned circumstances, and it is an object thereof to provide a power transmission device for an astride-riding vehicle having good drivability by improving the torque converter characteristics so as to obtain the above-mentioned linear properties.

In order to achieve the above-mentioned object, in accordance with a first aspect of the present invention, there is provided a power transmission device for an astride-riding vehicle, the power transmission device comprising a torque converter and a clutch disposed in series in a transmission route between an engine and a gear transmission system, wherein the torque converter is arranged so that a pump capacity is a maximum at a speed ratio $e=0$, and gradually decreases in response to an increase in the speed ratio $e$.

The gear transmission system corresponds to a gear speed change device M of an embodiment of the present invention, which will be described later.

In accordance with this first aspect, by the combined use of the torque converter having a pump capacity that is a maximum at a speed ratio $e=0$ and the clutch, which is in a cut-off state when idling, the vehicle can be prevented from being dragged when idling, and both the engine rotational speed and the turbine rotational speed can be increased substantially linearly when starting off and accelerating, thereby greatly improving the drivability of the sports astride-riding vehicle.

Furthermore, in accordance with a second aspect of the present invention, in addition to the first aspect, a blade of a pump impeller in the torque converter is disposed at an angle so that, going in the radially outward direction of the pump shell, a part where the blade is joined to an inner face of a pump shell approaches the direction of rotation of the pump impeller.

In accordance with this second aspect, the pump capacity can easily be made a maximum at a speed ratio $e=0$ by the disposition of the blade of the pump impeller.

Moreover, in accordance with a third aspect of the present invention, in addition to the second aspect, the inclination angle of the blade toward the direction of rotation relative to the plane of rotation of the pump impeller decreases in going from the inner peripheral side of the pump impeller toward the outer peripheral side thereof.

In accordance with this third aspect, the pump capacity can be made a maximum at a speed ratio $e=0$ also in a pump impeller having a comparatively small diameter.

Furthermore, in accordance with a fourth aspect of the present invention, in addition to the third aspect, the inclination angle of the blade toward the direction of rotation relative to the plane of rotation of the pump impeller is made to decrease rapidly on the outer peripheral side of the blade.

In accordance with this fourth aspect, the pump capacity can be made a maximum at a speed ratio $e=0$ also in a pump impeller having a small diameter.

The above-mentioned object, other objects, characteristics, and advantages of the present invention will become apparent from an explanation of a preferred embodiment, which will be described in detail below with reference to the attached drawings.

BEST MODE FOR CARRYING OUT THE INVENTION

A mode for carrying out the present invention is explained below with reference to an embodiment of the present invention shown in the attached drawings.

Figure 1:
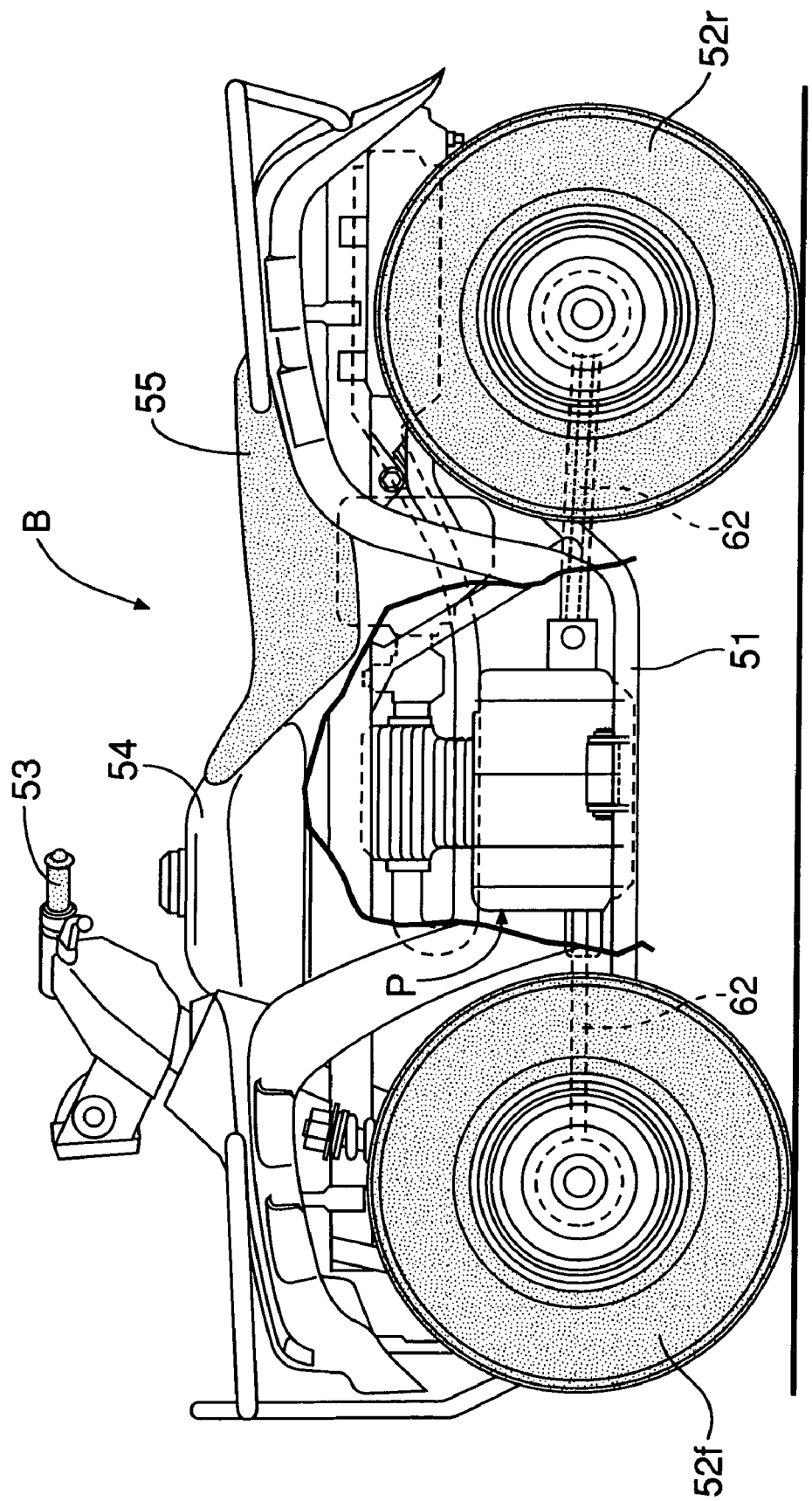
FIG. 1 is a side view of an astride-riding buggy equipped with a power transmission device of the present invention.

Firstly in FIG. 1, an astride-riding buggy B comprises pairs of left and right front wheels 52f and rear wheels 52r, which are suspended in a front part and a rear part respectively of a tubular steel vehicle body frame 51. Rod-shaped handlebars 53 for steering the front wheels 52f are disposed at the front end of the vehicle body frame 51, a fuel tank 54 is disposed in a longitudinally middle section of the vehicle body frame 51, and a saddle 55 is disposed in an upper part of the vehicle body frame 51 to the rear of the fuel tank 54.

A power unit P is mounted on and supported by the vehicle body frame beneath the fuel tank 54 and the saddle 55, and the output of the power unit P drives the front wheels 52f and the rear wheels 52r.

Figure 2:
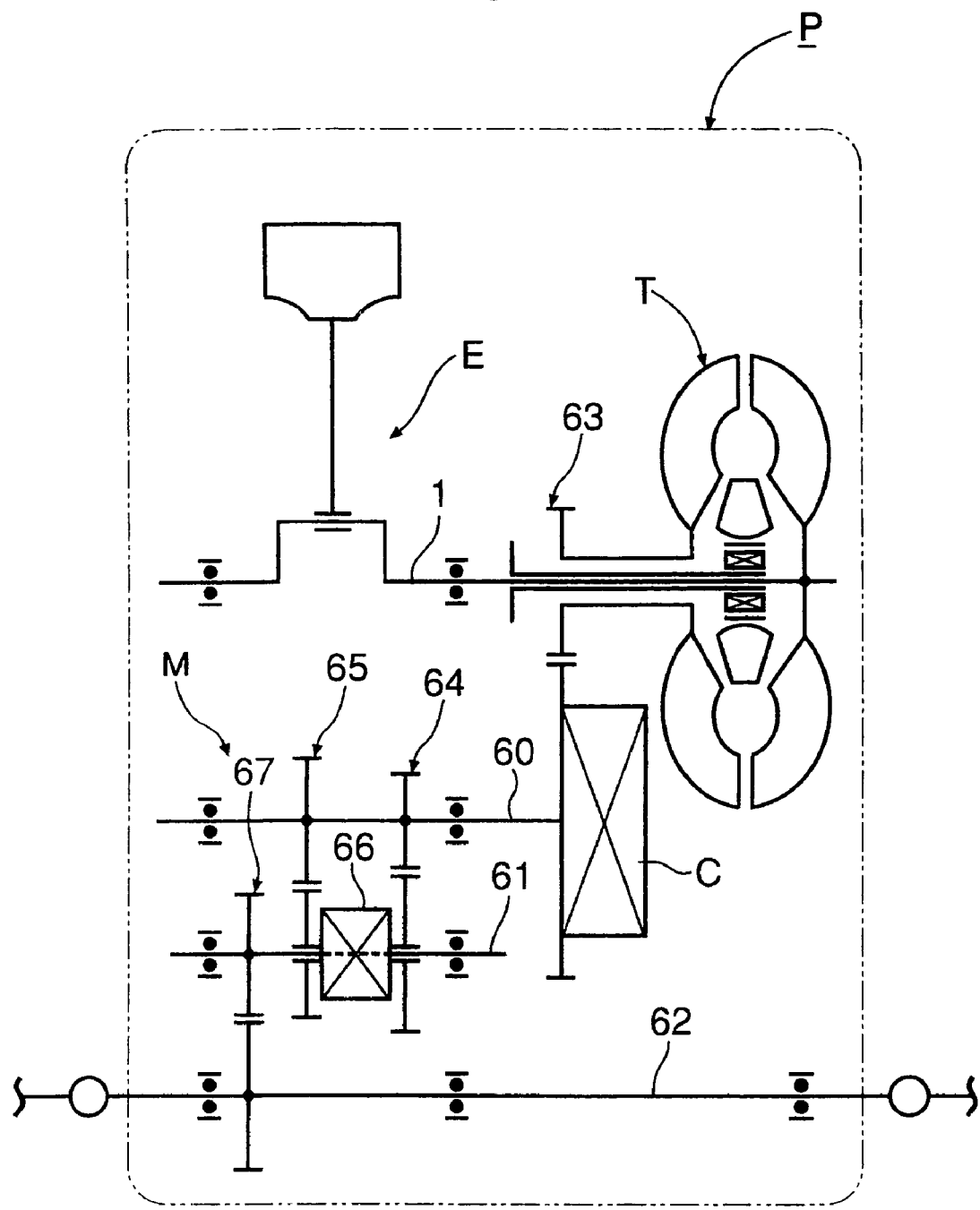
FIG. 2 is a schematic diagram of the power transmission device.

The power unit P is now explained with reference to FIG. 2.

The power unit P is formed by making an engine E and a gear speed change device M into a unit. Arranged on one side of a crankshaft 1 of the engine E and parallel thereto are a transmission input shaft 60, a transmission output shaft 61, and a propeller shaft 62. A torque converter T is mounted at one end of the crankshaft 1, a clutch C is mounted at one end of the transmission input shaft 60, an output member of the torque converter T, that is, a turbine shaft, and an input member of the clutch C are coupled together via a primary reduction gear train 63, and an output member of the clutch C is coupled to the transmission input shaft 60.

Disposed between the transmission input shaft 60 and the transmission output shaft 61 are a plurality of stages (two stages in the illustrated example) of transmission gear trains 64 and 65. Disposed between the transmission output shaft 61 and the propeller shaft 62 is a secondary reduction gear train 67. Disposed between the gear speed change device trains 64 and 65 is a change mechanism 66 for selectively establishing one of the gear speed change device trains 64 and 65. The transmission input shaft 60, the transmission output shaft 61, the gear speed change device trains 64 and 65, and the change mechanism 66 form the gear speed change device M.

The power of the engine E is thus transmitted to the front wheels 52f and the rear wheels 52r via, in sequence, the crankshaft 1, the torque converter T, the transmission input shaft 60, the primary reduction gear train 63, the clutch C, the selected gear speed change device train 64 or 65, the transmission output shaft 61, the secondary reduction gear train 67, and the propeller shaft 62, thereby driving the front wheels 52f and the rear wheels 52r simultaneously.

The clutch C has an automatic clutch function so that it is in a cut-off state when the engine E is idling and it is in a connected state when the engine rotational speed exceeds a predetermined rotational speed that is higher than the idle rotational speed, and also has a shift clutch function so that it engages and disengaged depending on the shift operation for selecting establishment of the gear speed change device trains 64 and 65.

The torque converter T is now explained in detail with reference to FIG. 3.

The torque converter T comprises a pump impeller 2, a turbine runner 3 whose outer peripheral part is positioned so as to oppose an outer peripheral part of the pump impeller 2, and a stator 4 that is arranged between inner peripheral parts of the pump impeller 2 and the turbine runner 3. A circulation circuit 12 via which the power is transmitted by a working oil is defined between these three components, that is, 2, 3, and 4. A side cover 5 for covering the outer face of the turbine runner 3 is connected by welding so as to be provided integrally with the pump impeller 2. The pump impeller 2 has a hub 2h spline-coupled to the crankshaft 1 and held between an annular shoulder part 1a on the outer periphery of the crankshaft 1 and a nut 15 screwed around the crankshaft 1. The pump impeller 2 is thus secured to the crankshaft 1.

The stator 4 is made of a light alloy such as an Al alloy, and includes a hub 4h having a small diameter inner periphery 35a and a large diameter inner periphery 35b on either side of a central partition 34. An iron sleeve 36 press-fitted in the small diameter inner periphery 35a is spline-coupled to an inner end of a stator shaft 7. Use of the press-fitted iron sleeve 36 in this way enables the light alloy stator 4 and the stator shaft 7 to be joined securely.

The stator shaft 7 is supported on the crankshaft 1 via a pair of left and right radial needle bearings 8 and 8'. A part of the hub 2h of the pump impeller 2 is positioned within the large diameter inner periphery 35b, and a thrust bearing 9 is disposed between the hub 2h and the partition 34.

The turbine runner 3 is fitted onto and welded to an inner end of a turbine shaft 6 surrounding the stator shaft 7, and the turbine shaft 6 is relatively rotatably supported on the outer periphery of the stator shaft 7 via a radial ball bearing 10 and a radial needle bearing 11. In this arrangement, the radial ball bearing 10 is disposed on the inner end side of the turbine shaft 6 and the radial needle bearing 11 is disposed on the outer end side thereof. A one-way clutch 13 is arranged so that when a reverse load acts on the turbine shaft 6, the one-way clutch 13 is in an ON state so as to provide a direct connection between the turbine shaft 6 and a hub 5h of the side cover 5.

The hub 5h is welded to the side cover 5 so as to surround the turbine shaft 6. The one-way clutch 13 and a radial ball bearing 14 are disposed axially adjacent to each other between an inner peripheral face of the hub 5h and an outer peripheral face of the turbine shaft 6, with the one-way clutch 13 being on the stator 4 side. A drive gear 63a of the primary reduction gear train 63 is secured so as to be adjacent to the outside of the radial ball bearing 14.

Formed integrally with the stator shaft 7 is an outer tube 19, which is adjacent to an outside face of the drive gear 63a. An inner tube 20 surrounded by the outer tube 19 is relatively rotatably fitted around the crankshaft 1 via a radial needle bearing 24, and a freewheel 23 is disposed between the inner and outer tubes 20 and 19. The inner tube 20 has a flange 20a at one end thereof, and this flange 20a latches onto a stationary pin 22 provided on a stationary structure 21 such as a crankcase of the engine E, and has the outer end face thereof supported on a positioning stopper 21a projectingly provided on the stationary structure 21. The flange 20a supports an end face of the outer tube 19 via a thrust bearing 25.

The structure of the pump impeller 2 is now explained with reference to FIG. 3 and FIG. 4.

The pump impeller 2 is formed from a bowl-shaped and annular shell 2s, a large number of blades 2b that are brazed to an inside face of the shell 2s at fixed positions, a retaining plate 2r that is brazed to the inner surface of the shell 2s and holds radially inner ends of these blades 2b, a core 2c that connects middle sections of all the blades 2b together, and the hub 2h welded to the inner peripheral edge of the shell 2s.

Formed in the shell 2s are a large number of positioning recesses 40 arranged in the peripheral direction. Engaged with each of the recesses 40 is a positioning projection 41 formed on the radially inner end of each of the blades 2b.

The retaining plate 2r is arranged so that an outer peripheral part thereof presses the positioning projections 41 of all the blades 2b toward the corresponding positioning recesses 40. Provided on this retaining plate 2r are positioning notches 42 with which the blades 2b engage.

Each of the blades 2b has a positioning projection 43 formed at the edge of the blade facing the core 2c, and a positioning hole 44 with which the positioning projection 43 engages is bored in the core 2c.

Referring again to FIG. 3, the crankshaft 1 has an oil supply passage 31 running through the center of the shaft and an inlet hole 26 and an outlet hole 27 extending radially from the oil supply passage 31. The oil supply passage 31 has an orifice 32 disposed between the inlet hole 26 and the outlet hole 27. The oil supply passage 31 is connected at one end to a discharge port of an oil pump 30 that is driven by the crankshaft 1 and at the other end to a lubrication section (not illustrated) of the engine. The inlet hole 26 communicates with the circulation circuit 12 via the radial needle bearing 8 and the thrust needle bearing 9, and the outlet hole 27 communicates with the circulation circuit 12 via an annular oil passage 29 formed between opposing surfaces of the crankshaft 1 and the stator shaft 7, a sideways hole 28 bored in the stator shaft 7, and the radial ball bearing 10.

Since the crankshaft 1 drives the oil pump 30 while rotating, the oil pump 30 keeps on pumping oil to the oil supply passage 31. A portion of the oil passes through the orifice 32, and the rest of the oil passes through the inlet hole 26, flows into the circulation circuit 12 within the torque converter T while lubricating the radial needle bearing 8 and the thrust bearing 9, fills the interior of the torque converter T, then lubricates the radial ball bearing 10 and the radial needle bearing 11, passes in sequence through the sideways hole 28, the annular oil passage 29, and the outlet hole 27, flows out to the downstream side of the oil supply passage 31, recombines with the oil that has passed through the orifice 32, and flows to the lubrication section (not illustrated) of the engine.

A portion of the oil within the circulation circuit 12 also flows toward the side cover 5 through a gap between the pump impeller 2 and the outer periphery of the turbine runner 3, and is supplied for lubrication of the one-way clutch 13 and the radial ball bearing 14. A portion of the oil that has entered the annular oil passage 29 passes through a gap between the crankshaft 1 and the stator shaft 7, thus lubricating the radial needle bearings 8' and 24 and the freewheel 23.

Figure 3:
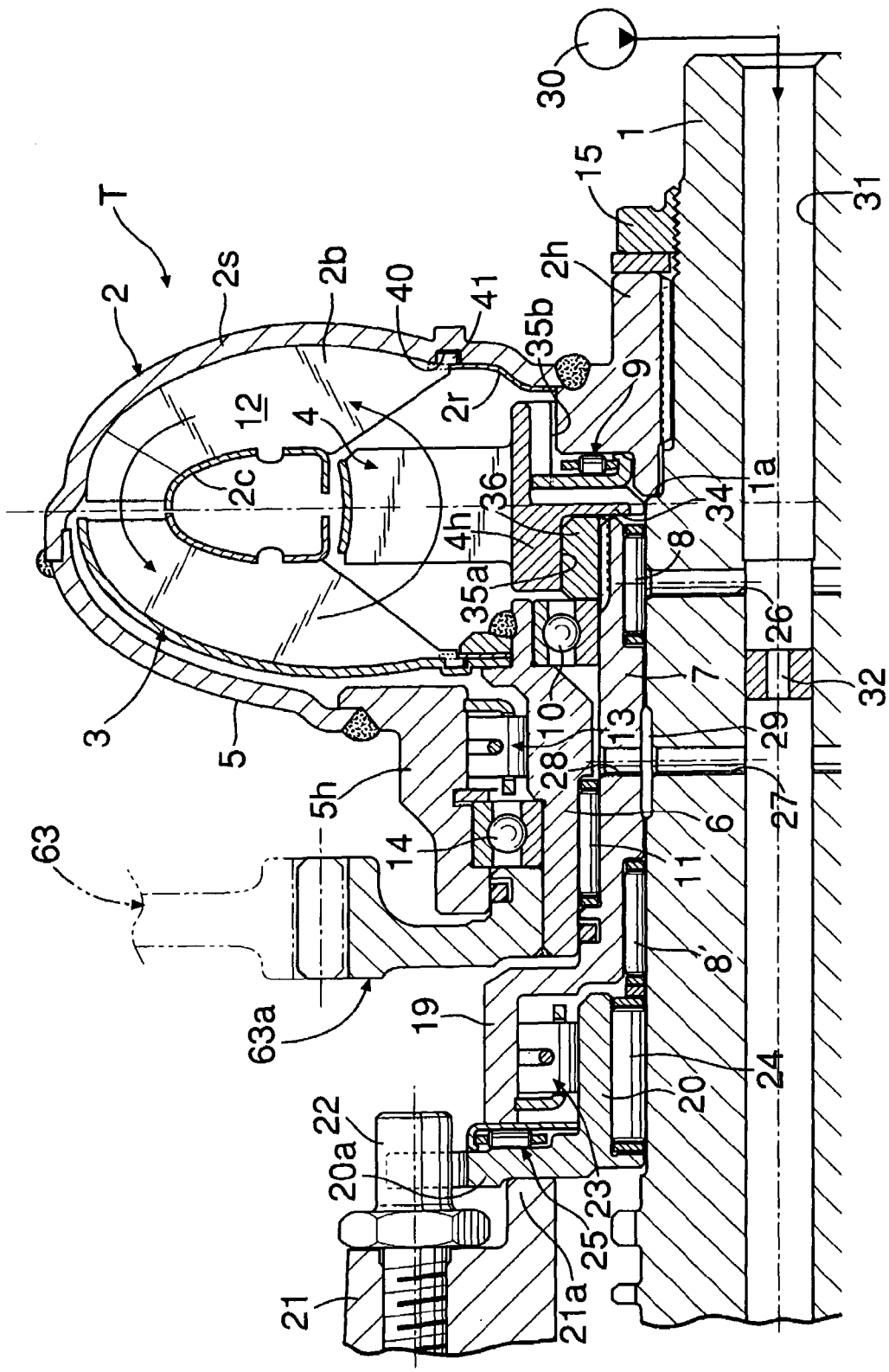
FIG. 3 is a longitudinal sectional view of a torque converter in the power transmission device.

In this way, when the engine operates, the rotation of the crankshaft 1 thereof is transmitted to the pump impeller 2, and when the pump impeller 2 rotates, the oil with which the circulation circuit 12 within the torque converter T is filled circulates as shown by the arrows in FIG. 3 from the pump impeller 2→the turbine runner 3→the stator 4→the pump impeller 2, thus transmitting the rotational torque of the pump impeller 2 to the turbine runner 3 and thereby driving the primary reduction gear train 63 from the turbine shaft 6. During this process, if a torque amplifying action is provided between the pump impeller 2 and the turbine runner 3, the accompanying reaction force is borne on the stator 4, and the stator 4 is supported by the stationary pin 22 by virtue of a locking operation of the freewheel 23.

When the torque amplifying action ends, as a result of the reversal of the direction of torque that the stator 4 receives, the stator 4 rotates in the same direction as that in which the pump impeller 2 and the turbine runner 3 rotate while making the freewheel 23 run at idle.

When a reverse load is transmitted from the primary reduction gear train 63 to the turbine shaft 6 during deceleration of the vehicle, the one-way clutch 13 is in an ON state, thus providing a direct connection between the turbine shaft 6 and the side cover 5, and the above-mentioned reverse load is transmitted directly from the turbine shaft 6 to the side cover 5, and then from the pump impeller 2 to the crankshaft 1. There is therefore no slip caused between the turbine runner 3 and the pump impeller 2, and a good engine braking effect can be obtained.

Figure 4:
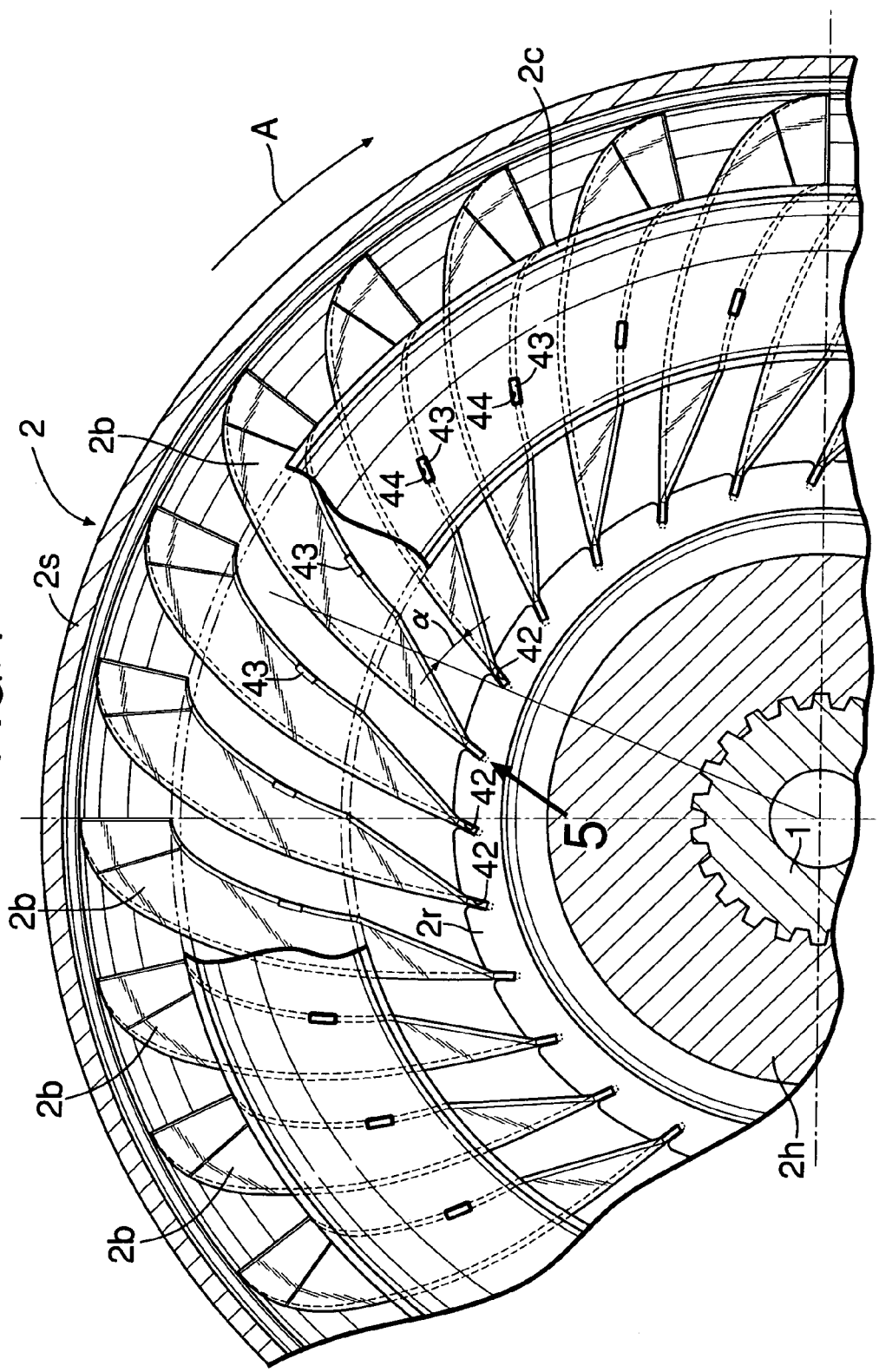
FIG. 4 is a view of the inside face of a pump impeller of the torque converter.
Figure 5:
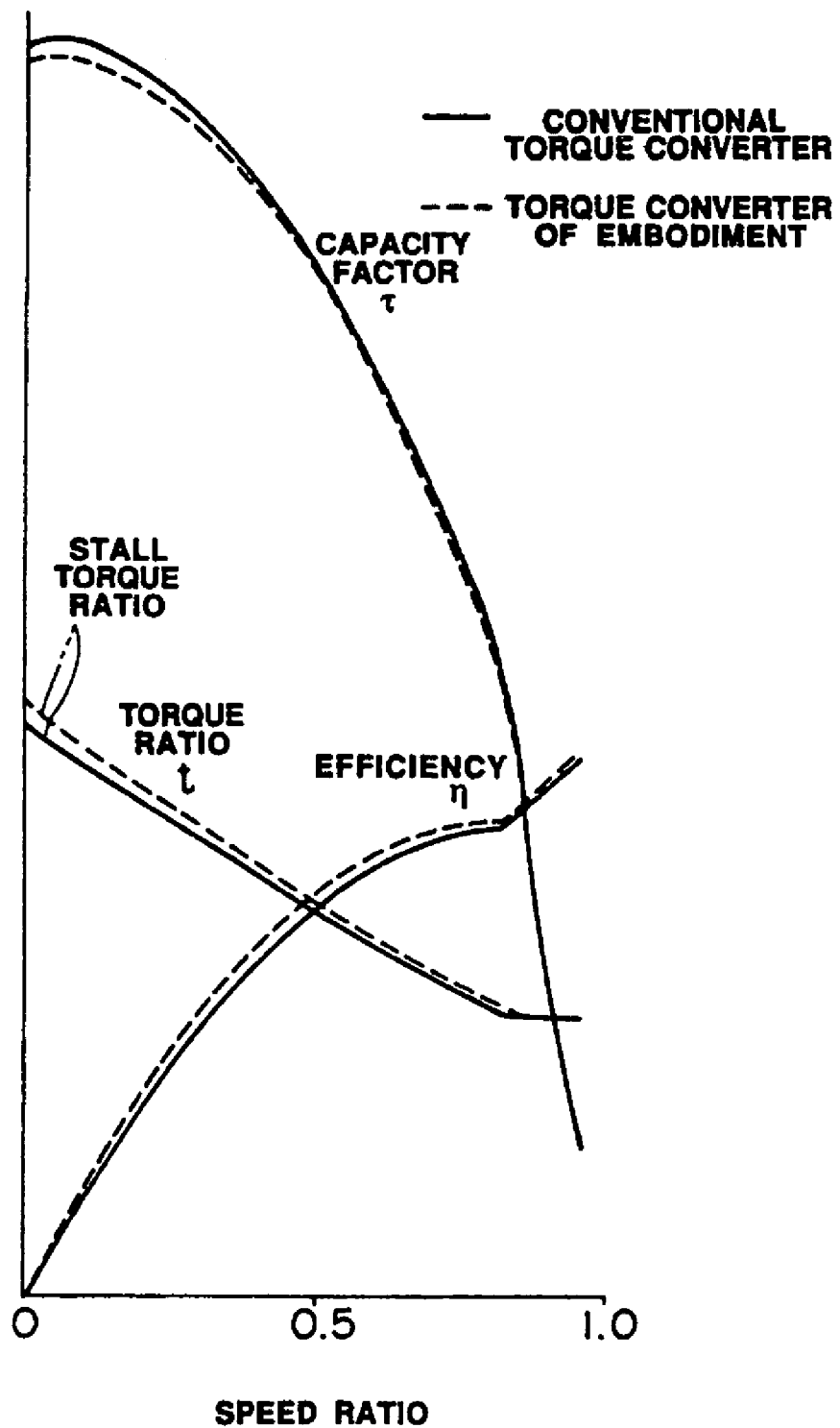
FIG. 5 is a view of a blade from arrow 5 in FIG. 4.

The above-mentioned torque converter T is characterized in particular by the shape and the attitude of each of the blades 2b of the pump impeller 2. That is:

(1) as shown in FIG. 4, each of the blades 2b is disposed at a predetermined angle α so that, going in the radially outward direction of the shell 2s, the part where the blade 2 is joined to the inner face of the shell 2s approaches the direction of rotation A of the pump impeller 2; and (2) as shown in FIG. 5, each of the blades 2b is formed so that the inclination angle β thereof toward the direction of rotation A relative to the plane of rotation R of the pump impeller 2 (a plane perpendicular to the axis of the pump impeller 2) decreases in going from the inner peripheral side of the pump impeller 2 toward the outer peripheral side thereof. That is, the inclination angle βo of the blade 2b on the outlet side of the pump impeller 2 is set so as to be smaller than the inclination angle βi of the blade 2b on the inlet side (inner peripheral side) of the pump impeller 2. In particular, the inclination angle β decreases rapidly on the outlet side of the pump impeller 2.

Employing the pump impeller 2 having blades 2b with the above-mentioned arrangements (1) and (2) imparts the pump capacity characteristics shown in FIG. 6 to FIG. 9 to the torque converter T and, in particular, in accordance with the above-mentioned arrangement (2), desired pump capacity characteristics can be obtained even when the pump impeller 2 has a comparatively small diameter.

The pump capacity is preselected in accordance with the calculations below.

Firstly, an engine rotational speed Ne (RPM) and an engine torque Te (Kgf·m) of an inflection point on the peak of an engine torque curve are found.

Next, a pump capacity τ0.8 when the speed ratio e of the torque converter T is 0.8 (coupling point) is determined from the equation below.

$$\tau 0.8 = Te/(Ne/0.8/1000)^2 \tag{1}$$

Next, a pump capacity τ0.5 when the speed ratio e is 0.5 is determined from the equation below.

$$\tau 0.5 = \tau 0.8 \times 1.5 \tag{2}$$

Finally, a pump capacity τ0 when the speed ratio e is 0 is determined from the equation below.

$$\tau 0 = \tau 0.8 \times 2 \tag{3}$$

Figure 6:
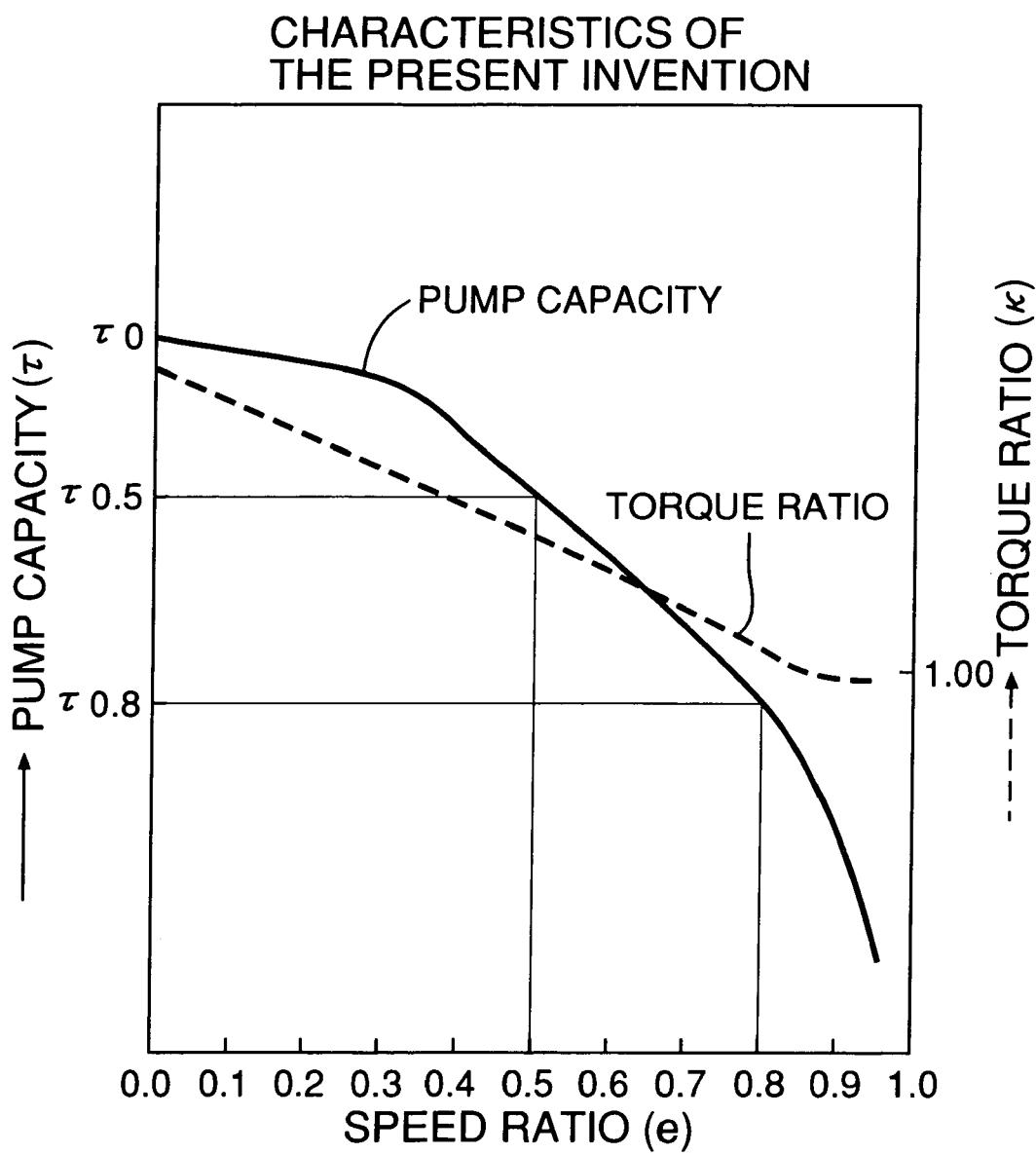
FIG. 6 is a graph showing the characteristics of the relationship between the speed ratio of the torque converter and the pump capacity according to the present invention.

Consequently, as shown in FIG. 6, the pump capacity τ is set to be a maximum when the speed ratio e=0, and to gradually decrease in response to an increase in the speed ratio e.

Figure 8:
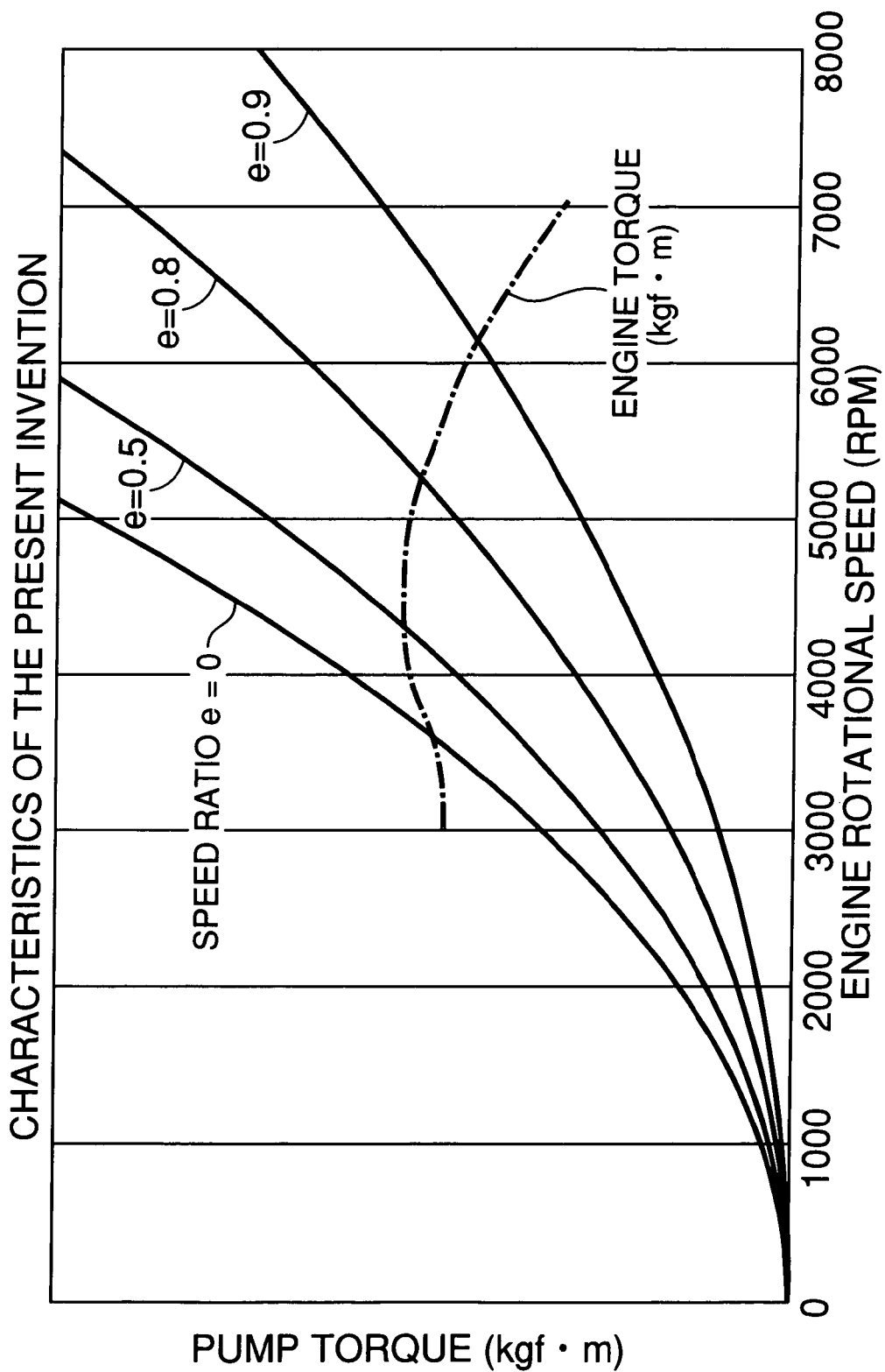
FIG. 8 is a graph showing the characteristics of the relationship between the engine rotational speed, the pump torque, and the speed ratio of the torque converter according to the present invention.
Figure 9:
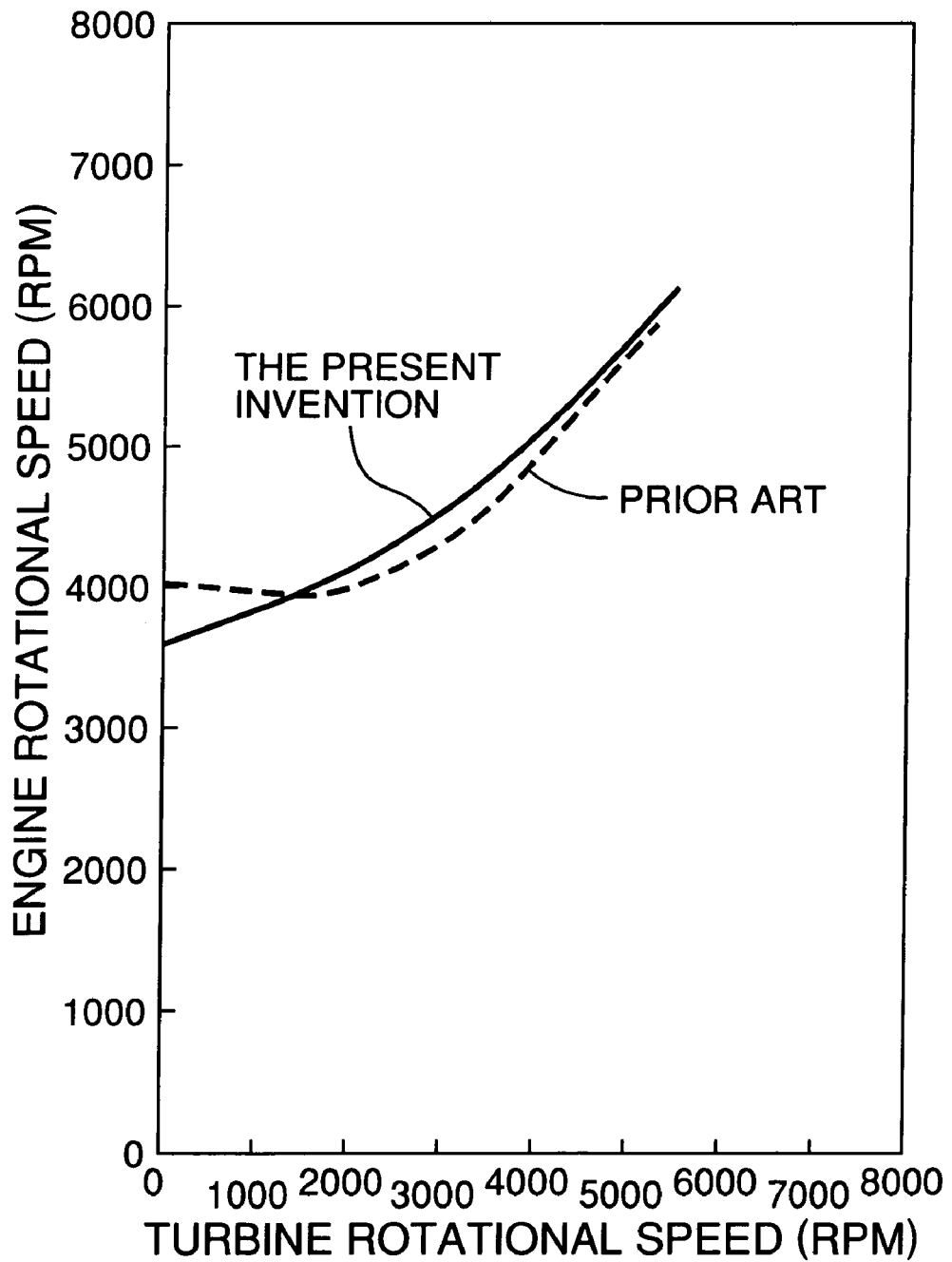
FIG. 9 is a graph showing the characteristics of the relationship between the turbine rotational speed of the torque converter and the pump rotational speed (engine rotational speed)
Figure 10:
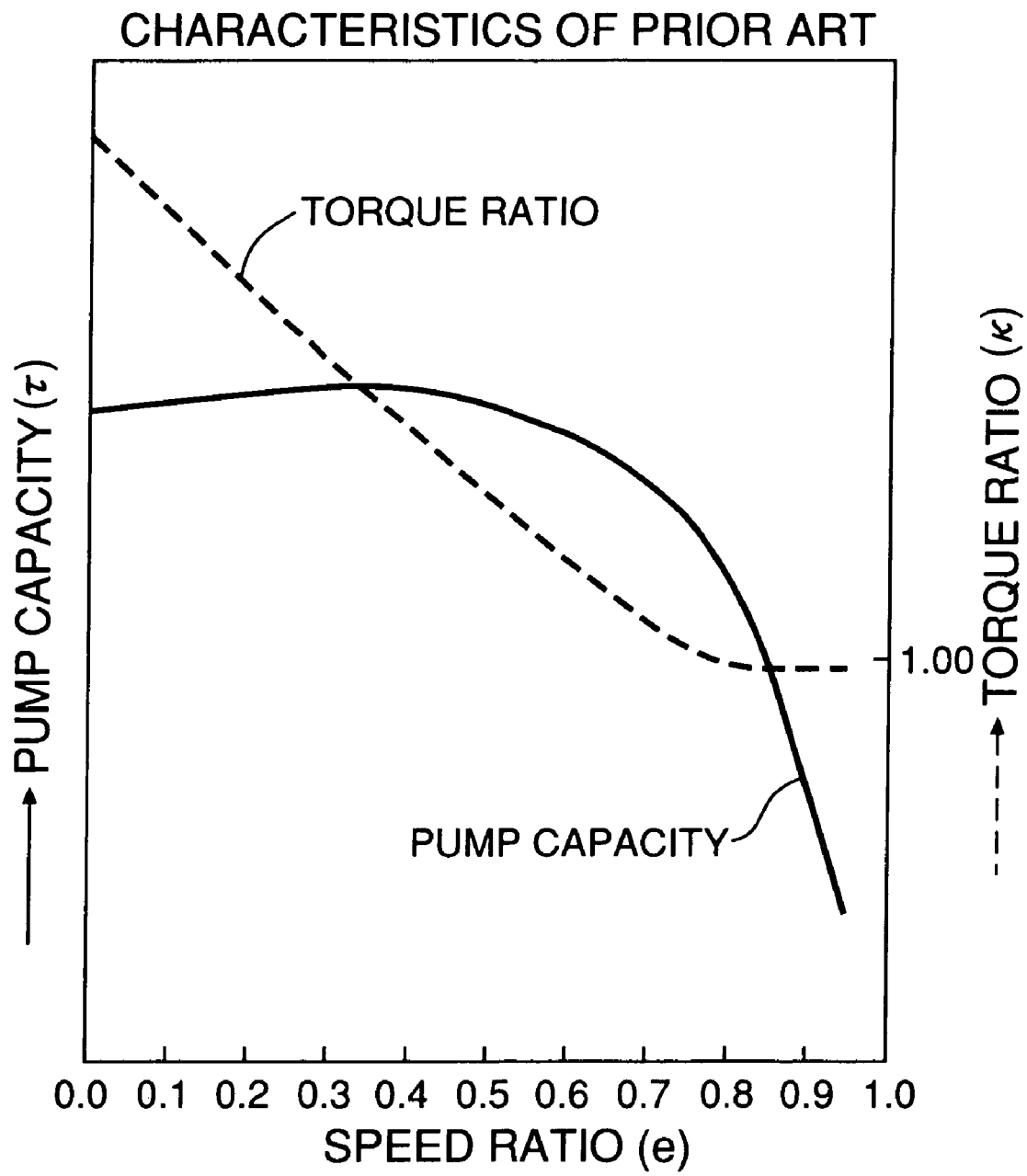
FIG. 10 is a graph showing representative characteristics of a conventional torque converter.
Figure 11:
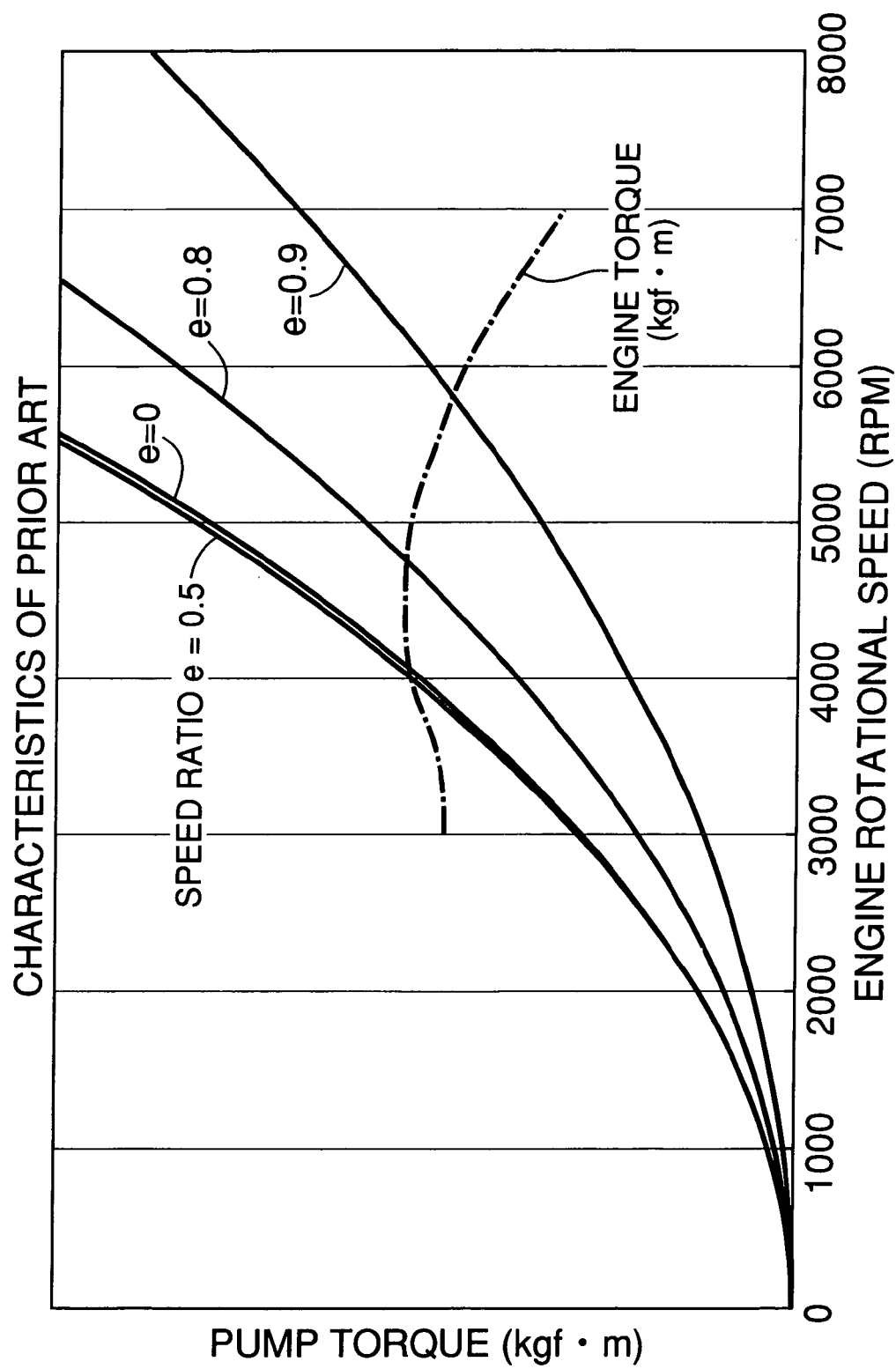
FIG. 11 is a diagram, corresponding to FIG. 8, showing the characteristics of a vehicle equipped with a conventional torque converter.

In accordance with such characteristics, as shown in FIG. 8, the gaps between the pump torque curves corresponding to each speed ratio $e$ are spread substantially equally. In particular, the gap between the pump torque curve at a speed ratio e=0 and the pump torque curve at a speed ratio e=0.5 is spread widely. A throttle valve of the engine E is carried out while the clutch C is connected, as shown by the solid line in FIG. 9, the engine rotational speed increases substantially linearly in proportion to the turbine rotational speed (the rotational speed of the turbine runner 3), that is, the vehicle speed, thereby providing good drivability.

By setting the pump capacity $\tau$ so as to be a maximum at a speed ratio e=0, creep of the torque converter T might be intensified when idling, but putting the clutch C in a cut-off state when idling enables the creep to be absorbed, thereby preventing the vehicle from being dragged.

As hereinbefore described, by the combined use of the torque converter T whose pump capacity $\tau$ is a maximum at a speed ratio e=0 and the clutch C that is put in a cut-off state when idling, vehicle drag can be prevented when idling, and both the engine rotational speed and the turbine rotational speed can increase substantially linearly when starting off and accelerating, thereby greatly improving the drivability of a sports astride-riding buggy B.

Figure 7:
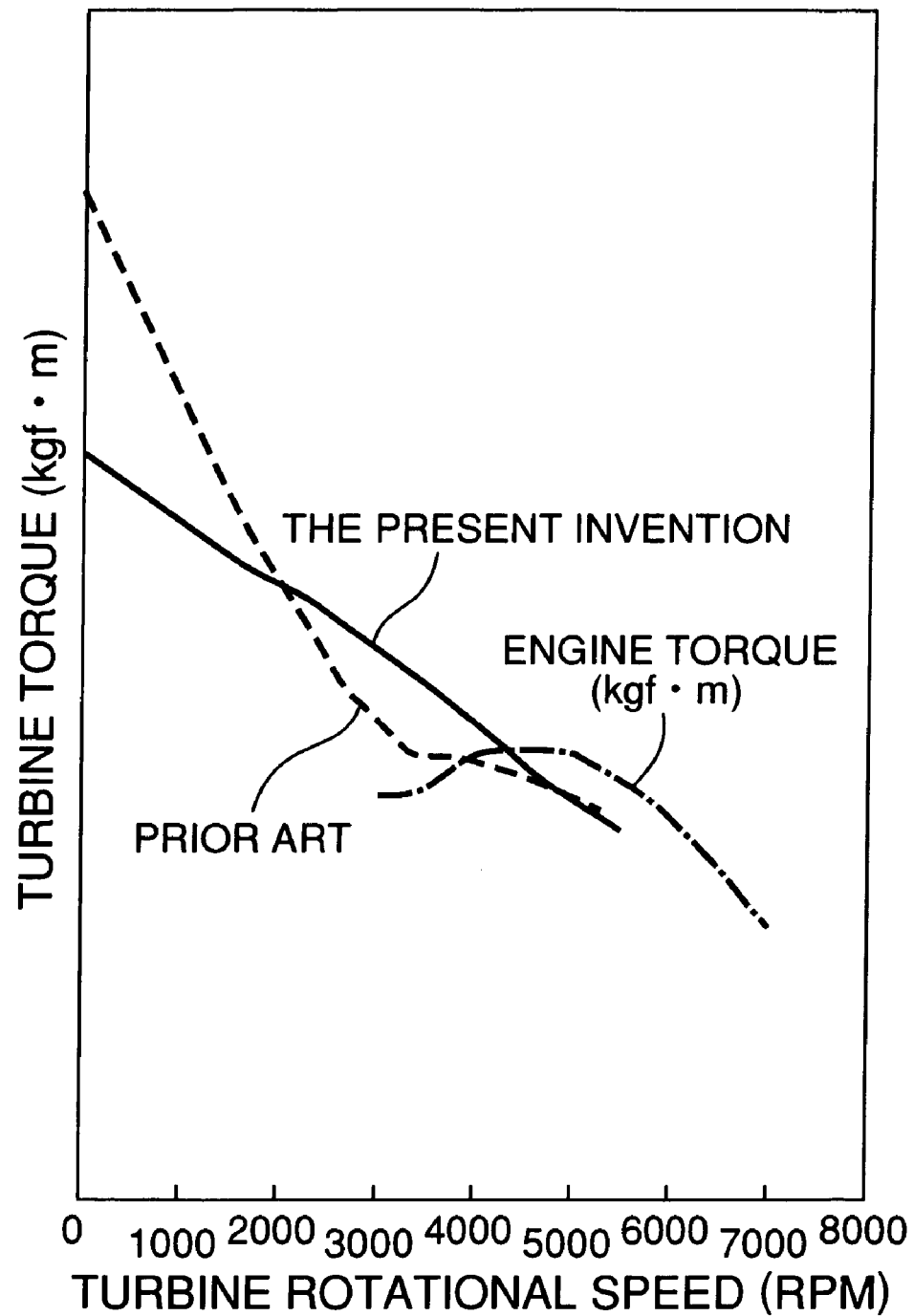
FIG. 7 is a graph showing the characteristics of the relationship between the turbine rotational speed and the turbine torque.

Furthermore, as shown in FIG. 6, the torque converter T is given torque characteristics such that when the torque ratio $\kappa$ is a minimum of 1, the speed ratio $e$ is at least 0.8. In accordance with these torque characteristics, as shown in FIG. 7, when the turbine torque decreases in response to an increase in the turbine rotational speed, the transfer from the turbine torque to the engine torque peak is smooth, so that no point of inflection occurs in the output torque, thereby obtaining a comfortable drivability.

The present invention is not limited to the above-mentioned embodiment and can be modified in a variety of ways without departing from the spirit and scope of the present invention. For example, in the above-mentioned embodiment, the torque converter T is disposed on the engine E side and the clutch C is disposed on the speed change device M side, but the same effects can be obtained by disposing the clutch C on the engine E side and the torque converter T on the speed change device M side. Furthermore, the speed change device M can be replaced with a gear speed reduction device having no speed change function.

What is claimed is:

1. A power transmission device for an astride-riding vehicle, the power transmission device comprising a torque converter and a clutch disposed in series in a transmission route between an engine and a gear transmission system, wherein the torque converter is arranged so that a pump capacity is a maximum at a speed ratio (e)=0, and gradually decreases in response to an increase in the speed ratio (e).

2. The power transmission device for an astride-riding vehicle according to claim 1, wherein a blade of a pump impeller in the torque converter is disposed at an angle so that, going in the radially outward direction of the pump shell, a part where the blade is joined to an inner face of a pump shell approaches the direction of rotation of the pump impeller.

3. The power transmission device for an astride-riding vehicle according to claim 2, wherein the inclination angle of the blade toward the direction of rotation relative to the plane of rotation of the pump impeller decreases in going from the inner peripheral side of the pump impeller toward the outer peripheral side thereof.

4. The power transmission device for an astride-riding vehicle according to claim 3, wherein the inclination angle of the blade toward the direction of rotation relative to the plane of rotation of the pump impeller is made to decrease rapidly on the outer peripheral side of the blade.

* * * * *